United States Patent

[11] 3,594,848

| [72] | Inventor | Earl E. Atkinson<br>3264 Colorado Lane, Costa Mesa, Calif. 92626 |
|---|---|---|
| [21] | Appl. No. | 803,124 |
| [22] | Filed | Jan. 15, 1969 |
| [45] | Patented | July 27, 1971<br>Continuation-in-part of application Ser. No. 699,172, Jan. 19, 1968, now abandoned. |

[54] MATERIALS HANDLING APPARATUS
7 Claims, 4 Drawing Figs.

[52] U.S. Cl. .................................................. 15/314, 15/340, 415/204
[51] Int. Cl. .................................................. A47l 5/00
[50] Field of Search .................................................. 15/340, 314; 56/DIG. 8; 302/34, 37; 103/96; 230/134.45; 415/204

[56] References Cited
UNITED STATES PATENTS

| 820,397 | 5/1906 | Davidson | 415/204 X |
| 5,203 | 7/1847 | Von Schmidt | 103/96 |
| 685,111 | 10/1901 | Dannelly | 302/34 UX |
| 1,649,161 | 11/1927 | Foster | 230/134.45 |

FOREIGN PATENTS

| 479,572 | 7/1929 | Germany | 302/37 |
| 486,505 | 6/1938 | Great Britain | 15/340 |

Primary Examiner—William I. Price
Attorney—Fulwider, Patton, Rieber, Lee and Utecht ABSTRACT: An apparatus for collecting and transporting solid materials such as trash, and including a blower for developing a vacuum in an intake conduit to transport the materials through the conduit in a stream of air to a collection bin or the like, the blower being of the centrifugal impeller type characterized by an outlet opening in the peripheral wall of the impeller housing, an inlet opening in a sidewall of the housing, and an inlet duct arranged so that its longitudinal centerline axis merges into the plane of rotation of the impeller adjacent the outer rim of the impeller, the inlet and outlet openings being located proximate each other so that solid matter entering the impeller chamber passes to the outlet with minimum contact with the impeller.

INVENTOR.
EARL E. ATKINSON
BY Fulwider, Patton, Rieber,
Lee and Utecht
ATTORNEYS

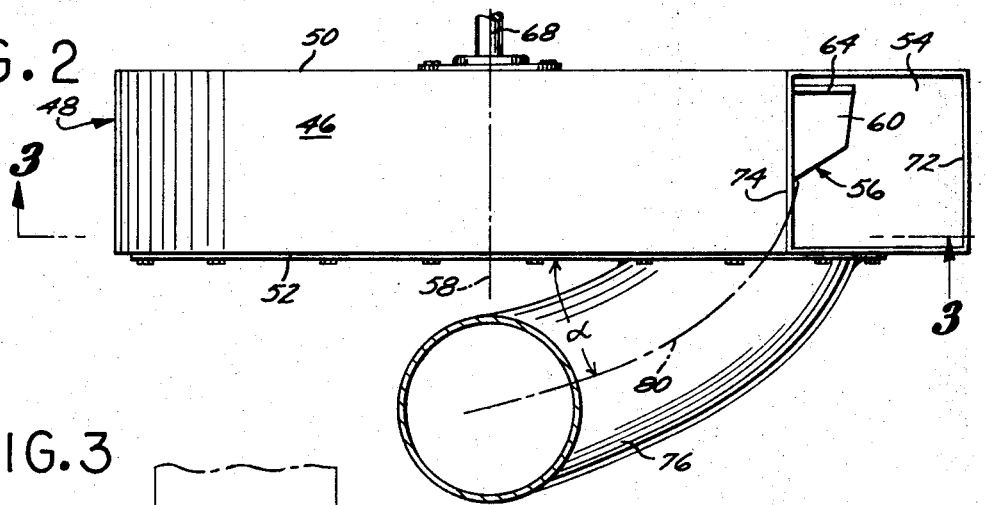
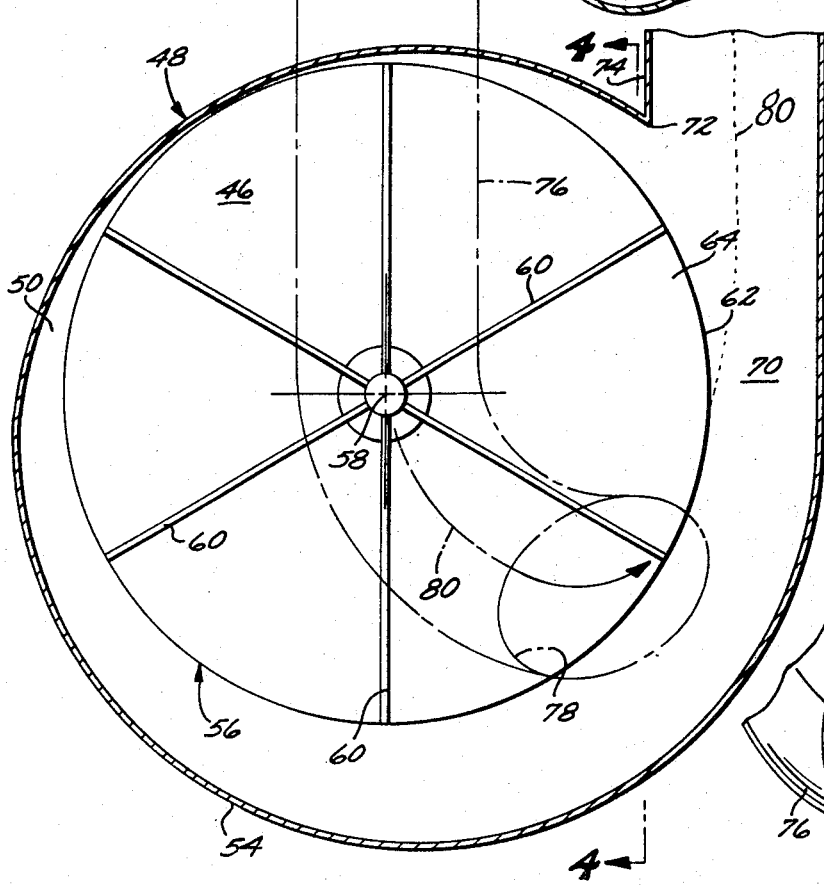
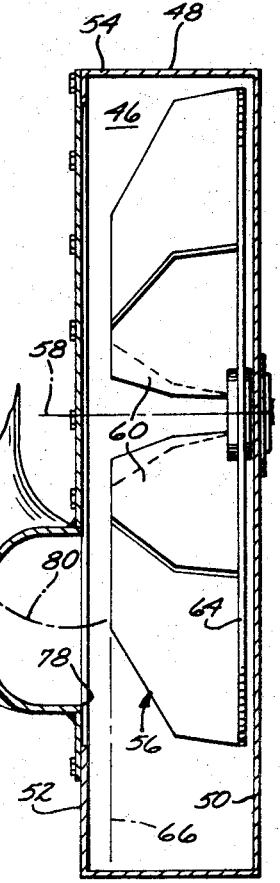
INVENTOR.
EARL E. ATKINSON

MATERIALS HANDLING APPARATUS

This is a continuation-in-part application of Ser. No. 699,172, filed Jan. 19, 1968 and now abandoned.

BACKGROUND OF THE INVENTION

1. Field of the Invention

The invention relates to the field of materials handling by means of apparatus which includes a blower operative to develop a vacuum in an intake conduit so that materials can be drawn in a stream of air through the conduit for engagement or action thereon by the blower impeller blades to facilitate discharge of the materials into a collection bin or the like.

2. Description of the Prior Art

Patrons of sports stadiums, horse racing tracks, and similar establishments indiscriminately discard paper, cartons, beer cans, soft drink bottles, and all manner of refuse and trash which often tends to collect in relatively inaccessible areas. Conventional sweeping equipment is incapable of being maneuvered around seats, guide railings, narrow doorways, and the like, and existing industrial vacuum cleaners do not have the capability of picking up articles such as beer cans and soft drink bottles or of transporting such articles any appreciable distance. Consequently, the cleaning of establishments of the character mentioned is almost entirely a hand operation. That is, personnel are employed to sweep the area with push brooms, pick up relatively heavy objects, and hand cart the collected debris through narrow aisles and the like. The cleaning of such establishments is therefore both costly and time consuming, and often is not properly performed.

SUMMARY

The present invention is a materials handling apparatus for collecting and transporting materials, such as trash, to a collection receptacle by means of a stream of air. The apparatus includes a centrifugal blower having a bladed rotary impeller. An inlet duct extends from an inlet opening to a collection end. The impeller chamber also has an outlet opening which is arranged, relative to the inlet opening and to the inlet duct adjacent the inlet opening, to obtain maximum benefit of the momentum of collected material moving through the inlet duct and the impeller chamber in the airstream produced by operation of the blower, thereby to minimize the power required to operate the blower and effect the transfer of collected materials to the collection receptacle to which the outlet is connected.

A conventional centrifugal blower or pump has the inlet opening to the impeller chamber located coaxially of the axis of rotation of the impeller. The impeller carries blades or vanes which extend radially of the impeller to its outer rim. Fluid entering the inlet opening (commonly called the suction inlet) has a total "head" (energy level) which is to be raised by the blower or pump. Total head is comprised of dynamic head (associated with fluid velocity) and pressure head (associated with the pressure of the fluid). Dynamic head is a measure of kinetic energy, and pressure head is a measure of potential energy. In a conventional centrifugal blower or pump, the fluid entering the suction inlet is caught up by the vanes of the rapidly rotating impeller and caused to rotate with the impeller. Centrifugal forces are effective upon such fluid and cause the fluid to move outwardly of the impeller along the vanes. As the fluid moves radially outwardly of the vanes, its velocity circumferentially of the impeller axis is equal to the velocity of the corresponding point of the impeller about the impeller axis until, when the fluid moves radially outwardly of the vanes, the fluid has a velocity about the axis equal to the vane tip velocity. Fluid leaves the impeller to enter a volute chamber, the blower or pump outlet opening being formed in the volute chamber which actually is a radial extension of the impeller chamber. In the volute chamber the high dynamic head of the fluid is at least partially converted to pressure head, and the total head of fluid in the volute chamber is greater than the total head of the fluid entering the suction inlet by an amount corresponding to the energy imparted to the fluid in its passage radially of the impeller.

The present apparatus differs from a conventional centrifugal blower in that the suction inlet of the present structure is located between the impeller axis and the impeller rim and closer to the rim than to the axis. Also, the distance circumferentially of the impeller between the inlet and outlet openings is a small portion of the circumference of the impeller. The present apparatus further differs from conventional centrifugal blowers in that the inlet duct to the impeller chamber does not extend normal to the plane of impeller rotation, but rather has its centerline disposed oblique to the plane of impeller rotation and is arranged to merge into the plane, to be approximately in line with the outlet duct from the volute chamber, and to approach as closely as practicable a condition of tangency to the impeller rim.

With this arrangement, the impeller blade tips strike or impinge against the solid materials entering the impeller chamber from the inlet duct so that articles such as glass bottles are shattered into extremely small particles, and metal cans are crushed. This forcible engagement, resulting from the location of the inlet opening relative to the blade tips not only provides a desirable crushing and shattering action as mentioned, but utilizes the impeller blades for purposes supplemental to their normal function of increasing the total head of air supplied to the impeller. The blades hit and forcibly thrust the materials through the impeller housing along a path which ends at the outlet opening from the impeller housing.

The momentum of the materials moving through the inlet duct to the impeller housing is substantially completely preserved by reason of the gradually merging relation of the inlet duct with respect to the path of the impeller blade tips. This avoidance of abrupt changes in direction of the moving materials greatly enhances the capacity of the present apparatus to move solid materials over considerable distances, and also provides minimum reduction of suction along the inlet duct between the collection openings and the impeller chamber.

Other advantages and features of the invention will become apparent from consideration of the following description taken in connection with the accompanying drawings.

BRIEF DESCRIPTION OF THE DRAWING

FIG. 2 is a top plan view of the impeller blower, partially in section, located in the loading vehicle of the apparatus shown in FIG. 1;

FIG. 3 is a view taken along the line 3—3 of FIG. 2 showing the inlet duct and inlet opening in phantom; and FIG. 4 is a view taken along the line 4—4 of FIG. 3.

DESCRIPTION OF THE PREFERRED EMBODIMENT

Figure 1:
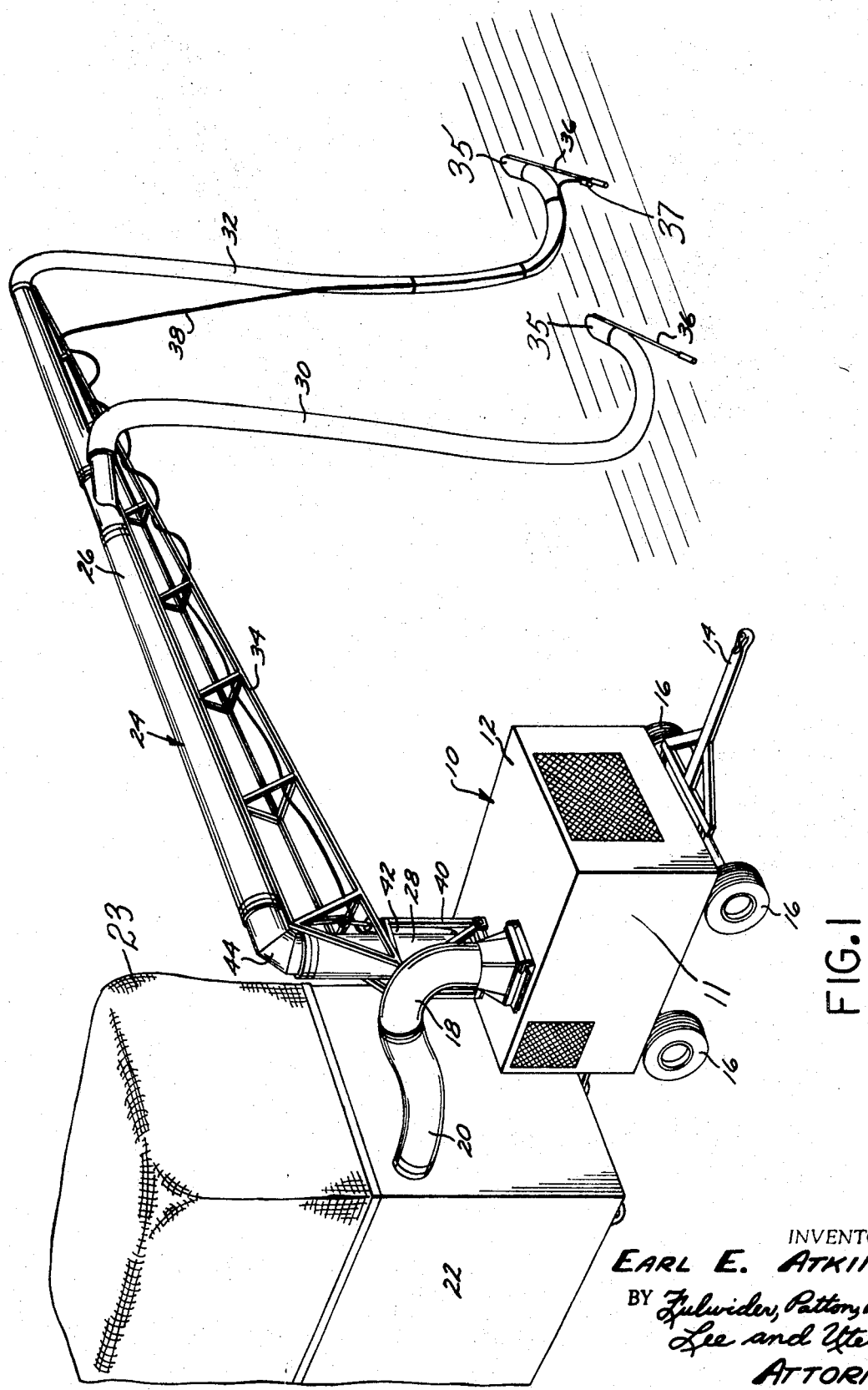
FIG. 1 is a perspective view of a materials handling apparatus according to the present invention.

Referring now to the drawings, there is illustrated a materials handling apparatus 10 which is particularly adapted for the collection and transportation of paper, metal cans, glass bottles, and the usual refuse and trash discarded in and about the seats of an outdoor stadium (not shown). The apparatus 10 is also adapted for use in handling and transporting various other types of solid materials including, without limitation, grain, silage, airport runway sweeping, street refuse and the like, the particular application described herein therefore being merely exemplary.

The apparatus 10 includes a protective shroud 11 mounted on a trailer-type vehicle 12 which is provided at its forward end with a tongue 14 so that the vehicle 12 can be attached to a towing vehicle (not shown) to permit the apparatus 10 to be rolled on its wheels 16 adjacent to the area from which trash and debris is to be cleared. A presently preferred embodiment of the invention utilizes a self-propelled towable vehicle chassis.

The trash collected by the apparatus 10 is discharged upwardly from the shroud into an outlet elbow 18 which, in turn, is connected to an outlet conduit 20 which empties into a collection bin 22. The bin is mounted upon wheels and is connected in any suitable fashion to the vehicle so as to be towed with the vehicle during movement of the apparatus about the area to be cleared of trash. The bin 22 is simply a large receptacle with an overlying porous cover 23 which retains dust and dirt in the bin but allows air to pass from the bin. The bins are readily interchangeable so that an empty bin is easily substituted for a full bin.

In the clearing of trash and debris from the seating area of a sports stadium, for example, vehicle 12 and bin 22 are moved along the perimeter of the track or playing field at the base of the sloping seating area. Trash is moved from the seating area to the vehicle by means of an elongated intake duct 24 which includes a substantially horizontal oriented portion 26 and a substantially vertically oriented portion 28. The intake duct also includes a pair of flexible branch conduits 30 and 32. A collection suction nozzle 35 is mounted to the free end of each branch conduit.

The horizontal portion 26 of the intake duct is supported upon an elongated trusslike structure constituting a boom 34 which supports the intake duct in cantilever fashion so that the duct may be moved over a relatively large seating area. Thus, with apparatus 10 stationed adjacent the base of a seating section, the boom supports the intake duct in such a fashion that branch conduits 30 and 32 hang downwardly from the boom for manipulation in and about the seats above which the boom projects. For this purpose, each suction nozzle includes a handle 36 by means of which an operator can manipulate the nozzle into position to pick up trash in and about the seats. One handle also mounts a switch 37, connected by an electrical lead 38 to apparatus 10, which may be operated to control the apparatus.

Debris drawn up through branch conduits 30 and 32 is carried through the horizontal portion of the intake duct and then downwardly through the vertical portion of the duct into the mechanism located within shroud 11 and for subsequent discharge into bin 22. It is preferable that the outer end of the boom 34 be capable of being swung in a horizontal plane, and also be capable of vertical movement. Although any suitable means may be provided for this purpose, in the embodiment shown boom 34 is pivotally mounted at its inner end to a cagelike pivot structure 40 through which the vertical portion of the intake conduit extends. The means for vertically pivoting the boom 34 upon the structure 40 includes a hydraulic ram 42 connected between the boom 34 and the structure 40. Extension of the ram effects upward movement of the boom 34, and retraction of the ram permits lowering of the boom 34. This relative pivotal movement between portions 26 and 28 of the intake duct is accommodated by a flexible coupling 44 which constitutes the elbow between duct portions 26 and 28.

Pivot structure 40 is mounted to the upper wall of the vehicle shroud in such a manner that it is adapted for rotation about a vertical axis, as by suitable slip rings, bearings or the like. Likewise, the lower extremity of the vertical portion of the intake duct is similarly carried through the upper wall of the shroud in such a way that it will rotate with the pivot structure 40. The particular details of this pivot structure do not form a part of the present invention, it being important only that the pivotal or rotational action be sufficiently free that the suction ends of branch conduits 30 and 32 can be moved laterally simply by pulling upon handles 36 with moderate force.

From the foregoing, it will be apparent that the suction ends of branch conduits 30 and 32 are generally located some distance from the portions of the apparatus 10 which produce the suction. Consequently, the suction or vacuum developed by the mechanism within shroud 11 must be sufficiently great that the suction at the branch conduits 30 and 32 is adequate to pick up bottles, cans, and other unwieldy debris with sufficient force to draw them upwardly and outwardly through the intake duct to the vehicle. As will be seen, the suction developed is very great, and the equipment which produces such suction is designed to offer minimum resistance to the passage of debris therethrough whereby the momentum of the moving debris as it enters the equipment is relatively undiminished by passage through the equipment and is efficiently transferred to bin 22. As a result, the power requirements of apparatus 10 are minimized.

Referring now to FIGS. 2 through 4, there is illustrated a centrifugal blower 46 which includes an impeller housing 48 having a pair of parallel side walls 50 and 52 spaced along the axis 58 of a rotary impeller 56, and a curving peripheral end wall 54 extending between the sidewalls. The blower also includes an impeller which is mounted for rotation about axis 58 and which includes a plurality of radially oriented impeller blades 60 whose tips describe a circular path 62 on rotation of the impeller. The inner edges of the blades are secured to a circular backing plate 64 located adjacent sidewall 50 and which strengthens the blades against deflection. Plate 64 prevents contact of debris with sidewall 50, thereby keeping to a minimum the power required to drive the impeller during use of apparatus 10. The impeller blades extend perpendicularly from plate 64 parallel to axis 58 into close proximity to sidewall 52. The plane of rotation of the impeller is represented in FIG. 4 by impeller backing plate 64. The outer ends of the impeller blades coincide with the periphery of plate 64.

The impeller 56 is secured to a rotatable shaft 68 which extends through the sidewall 50 of the housing, and the shaft 68 is connected to a motor (not shown) such as an internal combustion engine which is operative to rotate the impeller. The motor is preferably disposed within vehicle shroud 11 together with the usual accessory equipment, such as a starter and speed regulator, associated with such a motor, as will be apparent to those skilled in the art. Of course, an electric motor or other motive means for operating the blower 46 may be employed if desired.

As viewed in FIG. 3, the impeller 56 rotates in a counterclockwise direction, housing end wall 54 describing a spiral-shaped volute chamber 70 relative to the circular space occupied by the impeller. Proceeding in a counterclockwise direction, the dimensions of the chamber 70 increase progressively, radially of the impeller, reaching a maximum at the location of an outlet opening 72 from the chamber. The opening 72 is defined by a cutaway portion of wall 54, and constitutes the interface between chamber 70 and an elongated, vertically oriented portion 74 of an outlet duct which also includes elbow 18 (see FIG. 1). Portion 74 of the outlet duct extends tangentially of the circular path of rotation of the blade tips. Thus, the momentum acquired by debris from contact with the blade tips is relatively undiminished as such debris is thrust from the impeller into and along the outlet duct.

The lower end of vertical portion 28 of intake duct 24 has a curvilinear section 76 which is connected to housing sidewall 52 circumferentially of an impeller chamber inlet opening 78 formed through sidewall 52 between impeller axis 58 and the inner surface of housing peripheral end wall 54. That is, the inlet opening 78 is located eccentrically with respect to impeller axis 58 and preferably is roughly centered over the outer rim of impeller backing plate 64 a short distance removed from outlet opening 72 along path 62. In FIG. 3, the inlet opening and the lower end of the inlet duct are depicted in phantom lines.

As shown in FIG. 2 (a top plan view of the blower), in FIG. 3 (a front elevation view of the blower) and in FIG. 4 (a side elevation view of the blower), inlet duct curvilinear section is arranged relative to the housing so that the longitudinal centerline axis 80 of the duct is simultaneously oblique to the plane of rotation of the impeller, curved to approximate and merge into circular path 62, and (when extended) to pass tangentially of path 62 to and through outlet opening 72. Thus, in plan view, axis 80 is oblique to housing sidewall 52 by angle $\alpha$, rather than normal to the wall; the value of angle $\alpha$ is made as small as is practicable. An extension of axis 80 (represented by a dotted line in FIG. 3) merges with the circular path followed by the tips of impeller blades 60 during operation of the blower, and then passes essentially tangent to path 62 to outlet opening 72. The outlet opening, the inlet opening, and the curvilinear terminal portion of the inlet duct are all cooperatively positioned and arranged so that from a position along the inlet duct adjacent the inlet opening, through the inlet opening and the impeller housing, to outlet opening 72, axis 80 and its extension are curved as little as possible and define the straightest path possible consistent with design and structure of the remainder of apparatus 10. These features concerning the arrangement of axis 80 and its configuration are critical to the present invention; it has been found that when curvilinear section 76 is arranged so that its axis is normal to sidewall 52, the momentum of debris and of air moving through the section to the impeller chamber is diminished to such an extent that the suction manifested at nozzles 35 is insufficient to pick up objects such as bottles. That is, a disposition of the inlet duct normal to housing sidewall 52 produces such back pressure (head loss) to suction developed within the impeller chamber that such developed suction is not effectively transmitted to the suction nozzles.

By arranging inlet duct section 76 in the manner described above, the momentum developed by solid matter during movement along the inlet duct is conserved as such matter is introduced to the impeller chamber, with the result that only minimum additional energy must be imparted to the solid matter by the impeller to give the solid matter sufficient momentum upon leaving the impeller chamber that the solid matter will carry on through the outlet duct to bin 22. Solid matter approaching the impeller chamber, by reason of its momentum at such time, will tend to follow along the outside of the curve of the inlet duct adjacent inlet opening 78 and the bulk of such solid matter will enter the impeller chamber through that portion of the inlet opening which lies farthest from impeller axis 58. As a result, such solid matter will engage the impeller only adjacent the outer rim of the impeller where momentum-increasing energy is most efficiently transferred to the solid matter by the impeller. This means that solid matter entering the impeller housing imposes the smallest possible load upon the motor used to rotate the impeller, and the motor size may be reduced. The motor is required only to drive the impeller at a rate sufficient to develop the desired suction at nozzles 35 and to give solid matter introduced to the impeller a small boost onward to the collection bin.

If blower 46 were required only for the purposes of moving air and only air, the most efficient location of inlet opening 78 would be coaxially of the rotor. In the present invention, however, such a location of the inlet opening results in the imposition of undue load upon the impeller by solid matter entrained in the air column entering the impeller housing. Conversely, it is apparent that the inlet opening cannot be placed radially outwardly of the impeller; were this the case, the impeller would merely "windmill" uselessly in the housing and would neither develop any suction in the inlet duct nor assist the solid matter onwardly toward the collection bin. The above-described structural relations and features of the blower constitute an optimum solution to the several conflicting factors involved in the invention.

The essentially straight line relation between inlet opening 78 and outlet opening 72 results in only a negligible amount of collected debris being caught up by the impeller sufficiently to be carried past the outlet opening and around the interior of the housing.

In operation, rotation of impeller 46 causes air to be thrown outwardly by the vanes or blades 60, producing a lower pressure area at the more inwardly located inlet opening 78. In the manner described above, the impeller functions to create a vacuum in intake duct 24, which vacuum enables debris to be forcefully sucked into the nozzle ends of branch conduits 30 and 32. The collected debris is carried in a stream of air through the intake duct structure, and through inlet opening 78 into merging relation with the rapidly rotating blade tips. The blades engage and strike the debris, crushing metal cans, reducing bottles to very small pieces, and shredding and chopping other materials, while simultaneously thrusting all of such materials outwardly. The debris and air discharged from the impeller is collected in volute chamber 70 and immediately passed through outlet duct 74.

By reason of the foregoing particular arrangement of the inlet section, and in combination with the blower structure described, it has been found that the efficiency of the blower is so greatly increased that very high suction can be provided at the nozzles of the intake conduits without having to resort to very large, unwieldy, and expensive blowers.

Various modifications and changes may be made with respect to the foregoing detailed description without departing from the spirit of the invention or the scope of the following claims.

I claim:
1. Materials handling apparatus for transporting materials in a stream of air, said apparatus comprising:
   a blower including an impeller housing having axially spaced-apart sidewalls and a peripheral end wall defining a cylindrical chamber having a central axis,
   a bladed impeller in said cylindrical chamber and rotatable about an axis which is offset relative to said central axis of said chamber, whereby the blade tips describe a circular path during rotation of said impeller, and said circular path defines with said end wall a volute chamber of increasing volume in the direction of rotation of said impeller,
   said bladed impeller being proximate the sidewalls of said impeller housing,
   an inlet opening in one of said sidewalls located eccentrically with respect to the impeller axis and in that portion of the volute chamber having the greatest volume,
   said inlet opening being to one side of the axis of said bladed impeller and adjacent the periphery thereof, a portion of the inlet opening extending beyond the bladed impeller,
   an inlet section in communication with the inlet opening,
   said inlet section being arranged in oblique relation to said one of said sidewalls in both a tangential and radially outward direction, to approximate and merge into the circular path of rotation of said bladed impeller, and
   an outlet section in said housing for receiving materials from said impeller housing.

2. Apparatus according to claim 1 wherein said outlet section is so located that the longitudinal axis thereof is generally tangent to the circular path of the impeller in the vicinity of said inlet opening.

3. Apparatus according to claim 1 wherein said blades are substantially flat for engaging debris and batting it from said inlet opening and substantially directly toward said outlet opening.

4. Apparatus according to claim 1 and including a circular backing plate mounting the blades of said impeller, said plate being oriented for rotation in a plane parallel to the inner surface of the adjacent one of said sidewalls, and said blades each being oriented substantially perpendicular to said plate.

5. Apparatus according to claim 1 and including a laterally projecting boom; and an elongated intake conduit having a vertical portion coupled to said inlet section and a generally horizontal portion supported by said boom whereby materials in said stream of air are directed generally downwardly into said inlet section.

6. Apparatus according to claim 1 wherein the longitudinal axis of said outlet section adjacent said housing is generally vertically oriented.

7. Materials handling apparatus for transporting materials in a stream of air, said apparatus comprising:
   a mobile support,
   a housing mounted on said mobile support,
   an elongated intake duct extending from said housing,
   said intake duct including a vertical portion, a rigid horizontal portion extending from the upper terminus of said vertical portion, forming a laterally projecting boom, said vertical portion being pivotally connected with said housing to permit movement of said horizontal portion throughout a relatively wide sector, means for adjusting said horizontal portion vertically, at least one flexible air conduit hanging downwardly from said horizontal portion of the intake duct, for picking up material, a blower mounted within said housing in communication with said intake duct, said blower including an impeller housing having axially spaced-apart sidewalls and a peripheral end wall defining a cylindrical chamber having a central axis, a bladed impeller in said cylindrical chamber and rotatable about an impeller axis which is offset relative to said central axis of said chamber whereby the blade tips describe a circular path during rotation of said bladed impeller, and said circular path defines with said end wall a volute chamber of increasing volume in the direction of rotation of said impeller, a circular backing plate mounting the blades of said impeller, said plate being oriented for rotation in a plane parallel to the inner surface of the adjacent one of said sidewalls, and said blades each being oriented substantially perpendicular to said plate, an inlet opening in one of said sidewalls located eccentrically with respect to the impeller axis and in that portion of the volute chamber having the greatest volume, said inlet opening being to one side of the axis of said bladed impeller and adjacent the periphery thereof, a portion of the inlet opening extending beyond the bladed impeller, an inlet section joining the inlet opening with said intake duct, said inlet section being arranged in oblique relation to said one of said sidewalls in both a tangential and radially outward direction, to approximate and merge into the circular path of rotation of said bladed impeller, an outlet section in said housing for receiving materials from said impeller housing, said outlet section being so located that the longitudinal axis thereof is generally tangent to the circular path of the impeller in the vicinity of said inlet opening, and a receptacle for receiving materials from said outlet section.